United States Patent
Nidamanuri et al.

(10) Patent No.: US 11,244,317 B2
(45) Date of Patent: Feb. 8, 2022

(54) SYSTEMS AND METHODS FOR FEEDING A PREVIOUS CASE ACTION FOR A DECISION OF CONFIRMING FINANCIAL TRANSACTIONS

(71) Applicant: MasterCard International Incorporated, Purchase, NY (US)

(72) Inventors: Srinivasarao Nidamanuri, Chesterfield, MO (US); Daryl William Hurt, Wentzville, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1144 days.

(21) Appl. No.: 14/931,587

(22) Filed: Nov. 3, 2015

(65) Prior Publication Data
US 2017/0124570 A1    May 4, 2017

(51) Int. Cl.
*G06Q 20/40* (2012.01)
(52) U.S. Cl.
CPC ....... *G06Q 20/4016* (2013.01); *G06Q 20/401* (2013.01); *G06Q 20/409* (2013.01)
(58) Field of Classification Search
USPC .......................................................... 705/44
See application file for complete search history.

(56) References Cited

U.S. PATENT DOCUMENTS

| | | |
|---|---|---|
| 5,499,291 A | 3/1996 | Kepley |
| 7,184,539 B2 | 2/2007 | Colson et al. |
| 8,170,197 B2 | 5/2012 | Odinak |
| 8,204,746 B2 | 6/2012 | Odinak |
| 8,666,032 B2 | 3/2014 | Odinak |
| 8,750,489 B2 | 6/2014 | Park |
| 8,848,897 B2 | 9/2014 | Schultz et al. |
| 9,128,802 B2 | 9/2015 | Makagon et al. |

(Continued)

OTHER PUBLICATIONS

Full Text: Conference Paper; Key Innovations in the Payment Infrastructures in Bulgaria; by Trifonova, Silvia; (ICAICTSEE). (2013; https://www.proquest.com/docview/1550836044/4012A4757134275PQ/4?accountid=14753 (Year: 2013).*

(Continued)

*Primary Examiner* — Hani M Kazimi
*Assistant Examiner* — Hatem M Ali

(57) ABSTRACT

Examples of the disclosure enable a financial transaction to be automatically confirmed based on a similarity of factors between financial transactions. A previous case action may be used for a decision of confirming a financial transaction. A first request for authorization of a first financial transaction is received from a financial transaction processing computing device. One or more parameters associated with a cardholder account are identified, and it is determined, at a transaction score device, whether to approve the first request for authorization based on the one or more identified parameters. On condition that the first request for authorization is approved, the one or more parameters are updated based on one or more first factors associated with the first financial transaction such that a second request for authorization of a second financial transaction is analyzable based on the one or more updated parameters.

20 Claims, 8 Drawing Sheets

(56) References Cited

U.S. PATENT DOCUMENTS

| | | | | |
|---|---|---|---|---|
| 2003/0097330 A1* | 5/2003 | Hillmer | ................ | G06Q 20/206 |
| | | | | 705/38 |
| 2005/0149438 A1* | 7/2005 | Williams | ................ | G07G 1/14 |
| | | | | 705/40 |
| 2007/0246528 A1* | 10/2007 | Kubo | ................ | G06Q 20/40 |
| | | | | 235/380 |
| 2011/0022517 A1* | 1/2011 | Hammad | ............... | G06Q 20/12 |
| | | | | 705/44 |

OTHER PUBLICATIONS

Conference Paper: Remote Signatures for e-Government: The Case of Municipal Certification in Italy Martoni, Michele; Palmirani, Monica. European Conference on e-Government; Kidmore End : 310-XV. Kidmore End: Academic Conferences International Limited. (Jun. 2013);https://www.proquest.com/docv (Year: 2013).*

Conference Paper; Secret Sharing for High Security Codes on Smart-Cards; Crocker, Paul; Peixinho, Adolfo. European Conference on Information Warfare and Security; Reading : 45-IX. Reading: Academic Conferences International Limited. (Jul. 2013); https://www.proquest.com/docview/1400694887/401 (Year: 2013).*

* cited by examiner

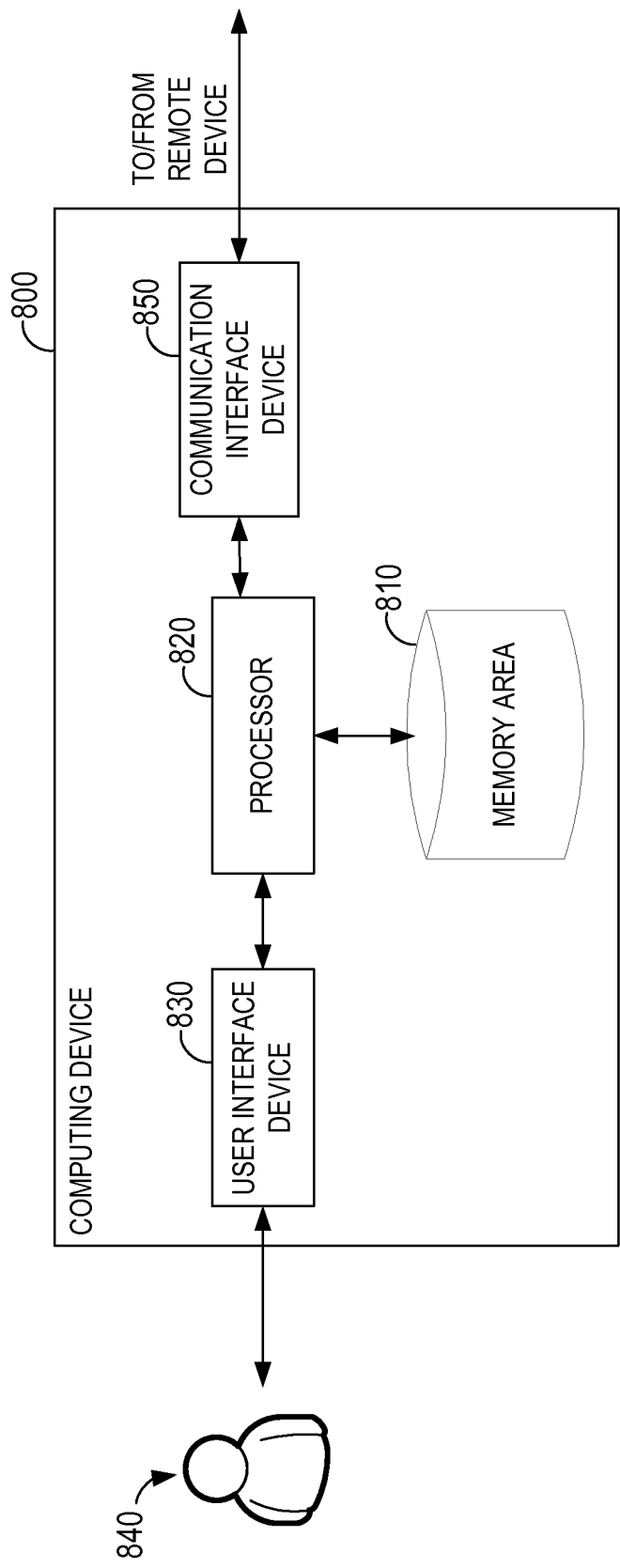

SYSTEMS AND METHODS FOR FEEDING A PREVIOUS CASE ACTION FOR A DECISION OF CONFIRMING FINANCIAL TRANSACTIONS

FIELD OF THE DISCLOSURE

The subject matter described herein relates generally to information processing and, more specifically, to feeding one or more previous case actions for one or more decisions of confirming one or more financial transactions.

BACKGROUND

Financial transaction cards have made great gains as a means to attract financial accounts to financial institutions and, in the case of credit cards, as a medium to create small loans and generate interest income for financial institutions. However, fraudulent financial transactions involving credit cards and other similar payment mechanisms may result in huge losses for cardholders, merchants, banks, and other financial institutions. Cardholders may be increasingly bothered, annoyed, and/or inconvenienced with each request to confirm a potentially fraudulent financial transaction as a legitimate financial transaction.

SUMMARY

Embodiments of the disclosure enable a financial transaction to be automatically confirmed and/or verified based on a commonality or similarity of one or more factors of the financial transaction with one or more factors of one or more previous case actions. In one aspect, a method is provided for feeding a previous case action for one or more decisions of confirming one or more financial transactions. The method includes receiving, from a financial transaction processing computing device, a first request for authorization of a first financial transaction, identifying one or more parameters associated with a cardholder account, determining, at a transaction score device, whether to approve the first request for authorization based on the one or more identified parameters, and, on condition that the first request for authorization is approved, updating the one or more parameters based on one or more first factors associated with the first financial transaction such that a second request for authorization of a second financial transaction is analyzable based on the one or more updated parameters.

In another aspect, a computing device is provided for feeding a previous case action for one or more decisions of confirming one or more financial transactions. The computing device includes a memory storing data associated with one or more cardholder accounts and computer-executable instructions, and a processor configured to execute the computer-executable instructions to identify one or more first parameters associated with a first cardholder account stored in the memory, determine whether to approve a first request for authorization of a first financial transaction associated with one or more first factors based on the one or more identified first parameters, and, on condition that the first request for authorization is approved, generate one or more second parameters based on the one or more first factors associated with the first financial transaction such that a second request for authorization of a second financial transaction is analyzable based on the one or more second parameters.

In yet another aspect, a computer-readable storage device having computer-executable instructions embodied thereon is provided. Upon execution by at least one processor, the computer-executable instructions cause the processor to identify one or more parameters associated with a cardholder account, determine whether to approve a first request for authorization of a first financial transaction based on the one or more identified parameters, and, on condition that the first request for authorization is approved, update the one or more parameters based on one or more first factors associated with the first financial transaction such that a second request for authorization of a second financial transaction is analyzable based on the one or more updated parameters.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 8 is a block diagram illustrating an example computing device that may be used to feed one or more previous case actions for a decision of confirming one or more financial transactions.

Corresponding reference characters indicate corresponding parts throughout the drawings.

DETAILED DESCRIPTION

Figure 1:
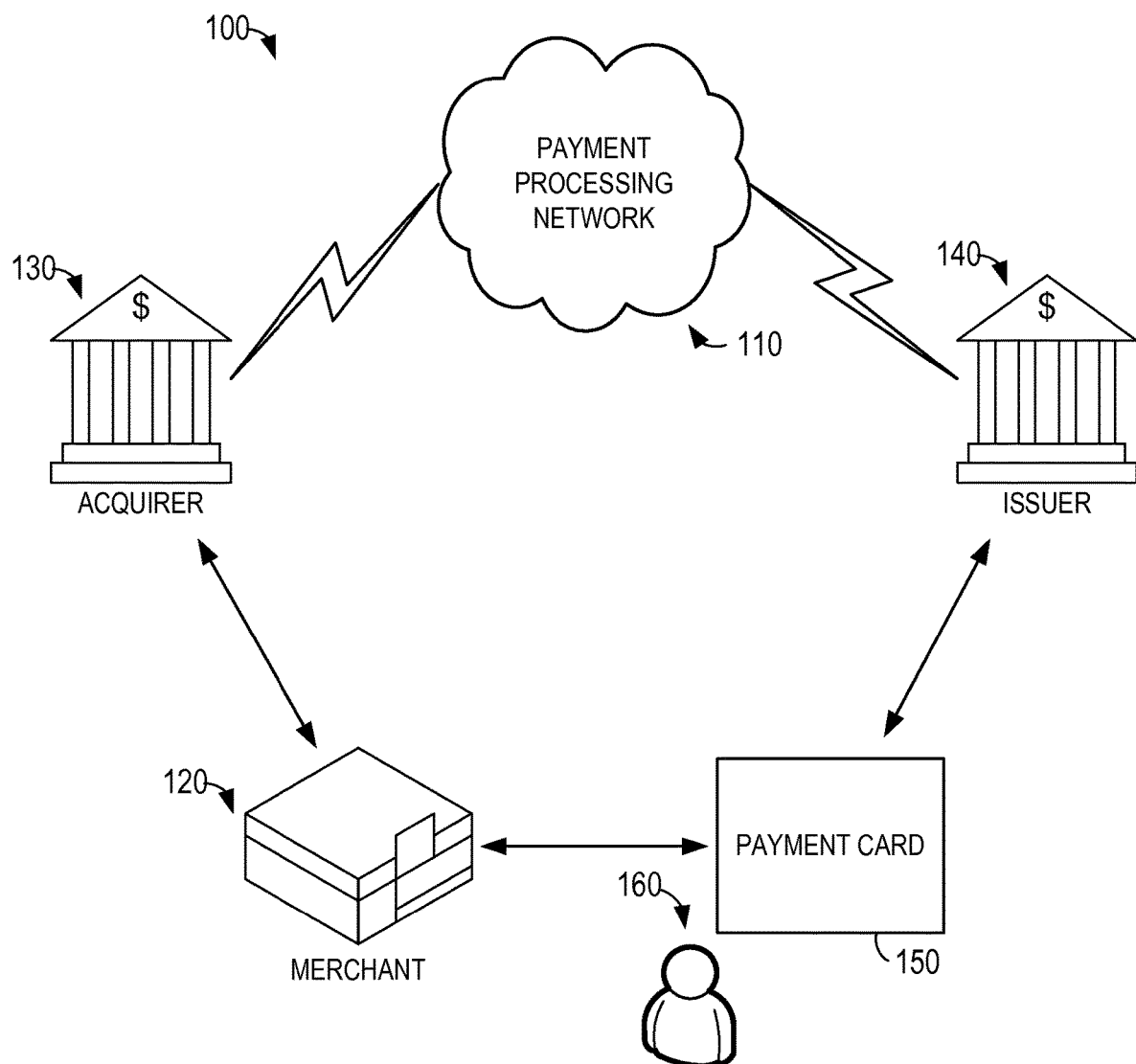
FIG. 1 is a block diagram illustrating an example environment for processing financial transactions.

The subject matter described herein relates to feeding one or more previous case actions for one or more decisions of confirming one or more financial transactions. Embodiments of the disclosure provide the ability to automatically confirm and/or verify one or more financial transactions without prompting a cardholder to confirm and/or verify the financial transaction, thereby providing at least some opportunity to streamline the processing of financial transactions based on a commonality or similarity of one or more factors between financial transactions. Embodiments described herein enable a computer system to receive a request for authorization of a first financial transaction, identify one or more parameters associated with a cardholder account, determine whether to approve the request for authorization, and update the one or more parameters associated with the cardholder account based on one or more factors associated with the financial transaction.

Aspects of the disclosure provide for a processing system that processes one or more financial transactions in an environment including a plurality of devices coupled to each other via a network (e.g., a local area network, a wide area network, the Internet). For example, a transaction score device may approve a request for authorization of a financial transaction, and update one or more parameters associated with a cardholder account based on one or more first factors associated with the financial transaction such that the transaction score device may determine whether to approve a subsequent financial transaction in accordance with the one or more updated parameters. In this manner, the subsequent financial transaction may be automatically confirmed and/or verified without prompting a cardholder to confirm and/or verify the financial transaction.

The systems and processes described herein may be implemented using computer programming or engineering techniques including computer software, firmware, hardware or a combination or subset thereof. At least one technical problem with known transaction processing systems is that, with the volume of financial transactions and the diversity of preferences between cardholders, it can be difficult, tedious, and/or time consuming to determine whether a particular financial transaction is legitimate or illegitimate. The embodiments described herein address that technical problem. For example, by processing financial transactions in the manner described in this disclosure, some embodiments improve cardholder confidence in financial institutions by updating one or more parameters associated with a cardholder account based on one or more factors associated with a previous financial transaction to shut down future point-of-sale fraud while achieving a balance between the security from fraud and convenience to the cardholder. Additionally, some embodiments may improve processor security and/or data transmission security by processing one or more financial transactions using one or more updated parameters; improve user efficiency and/or user interaction performance by reducing the number of requests to confirm a potentially fraudulent financial transaction as a legitimate financial transaction; and reduce error rate by automating the analysis and processing of financial transactions. In some embodiments, the subject matter described herein may facilitate increasing processor speed, reducing processor load, improving communication between systems, reducing network bandwidth usage, and/or improving operating system resource allocation.

The technical effect of the systems and processes described herein is achieved by performing at least one of the following operations: a) receiving a request for authorization of a financial transaction; b) determining whether a cardholder account is associated with a security mechanism; c) identifying one or more parameters associated with the cardholder account; d) generating a score associated with the financial transaction; e) determining whether to approve the request for authorization; f) transmitting an instruction to prompt a cardholder to confirm the request for authorization; g) receiving a confirmation of the request for authorization; h) approving the request for authorization; i) retrieving at least one case action; j) receiving a non-monetary message; k) updating the one or more parameters; l) generating one or more parameters; and m) maintaining the one or more parameters.

FIG. 1 is a block diagram illustrating an example system or environment 100 for processing financial transactions. The environment 100 includes a processing network 110, such as the MASTERCARD® brand payment processing network (MASTERCARD® is a registered trademark of MasterCard International Incorporated located in Purchase, N.Y.). The MASTERCARD® brand payment processing network is a propriety network for exchanging financial transaction data between members of the MASTERCARD® brand payment processing network.

The environment 100 includes one or more merchants 120 that accept payment via the processing network 110. To accept payment via the processing network 110, the merchant 120 establishes a financial account with an acquirer 130 that is a member of the processing network 110. The acquirer 130 is a financial institution that maintains a relationship with one or more merchants 120 to enable the merchants 120 to accept payment via the processing network 110. The acquirer 130 may also be known as an acquiring bank, a processing bank, or a merchant bank.

The environment 100 includes one or more issuers 140 that issue or provide payment cards 150 (e.g., credit card, debit card, prepaid card, and the like) or other payment products to one or more cardholders 160 or, more broadly, account holders ("cardholder" and "account holder" may be used interchangeably herein). The issuer 140 is a financial institution that maintains a relationship with one or more cardholders 160 to enable the cardholders 160 to make a payment using the payment card 150 via the processing network 110.

A cardholder 160 uses a payment product, such as a payment card 150, to purchase a good or service from a merchant 120. In some embodiments, the payment card 150 is linked or associated with electronic wallet technology or contactless payment technology, such as a radio frequency identification (RFID)-enabled device, a BLUETOOTH® brand wireless technology-enabled device, a ZIGBEE® brand communication-enabled device, a WI-FI® brand local area wireless computing network-enabled device, a near field communication (NFC) wireless communication-enabled device, and/or any other device that enables the payment card 150 to purchase a good or service from a merchant 120. (BLUETOOTH® is a registered trademark of Bluetooth Special Interest Group, ZIGBEE® is a registered trademark of the ZigBee Alliance, and WI-FI® is a registered trademark of the Wi-Fi Alliance). The cardholder 160 may use any payment product that is linked or associated with a corresponding financial account maintained by an issuer 140. As described herein, the term "payment card" includes credit cards, debit cards, prepaid cards, digital cards, smart cards, and any other payment product that is linked or associated with a corresponding financial account maintained by an issuer 140. Payment cards 150 may have any shape, size, or configuration that enables the environment 100 to function as described herein.

A cardholder 160 may present the merchant 120 with a payment card 150 to make a payment to the merchant 120 in exchange for a good or service. Alternatively, the cardholder 160 may provide the merchant 120 with account information associated with the payment card 150 without physically presenting the payment card 150 (e.g., for remote financial transactions, including e-commerce transactions, card-not-present transactions, or card-on-file transactions). Account information may include a name of the cardholder 160, an account number, an expiration date, a security code (such as a card verification value (CVV), a card verification code (CVC), and the like), and/or a personal identification number (PIN).

The merchant 120 requests authorization from an acquirer 130 for at least the amount of the purchase. The merchant 120 may request authorization using any financial transaction computing device configured to transmit account information of the cardholder 160 to one or more financial transaction processing computing devices of the acquirer 130. For example, the merchant 120 may request authorization through a point-of-sale (POS) terminal, which reads account information of the cardholder 160 from a microchip or magnetic stripe on the payment card 150, and transmits the cardholder's account information to the one or more financial transaction processing computing devices of the acquirer 130. For another example, the POS terminal reads account information of the cardholder 160 from a device configured to communicate with the POS terminal using contactless payment technology, and transmits the cardholder's account information to one or more financial transaction processing computing devices of the acquirer 130.

Using the processing network 110, the financial transaction processing computing devices of the acquirer 130 communicate with one or more financial transaction processing computing devices of an issuer 140 to determine whether the account information of the cardholder 160 matches or corresponds with the account information of the issuer 140, whether the account is in good standing, and/or whether the purchase is covered by (e.g., less than) a credit line or account balance associated with the financial account. Based on these determinations, the financial transaction processing computing devices of the issuer 140 determine whether to approve or decline the request for authorization from the merchant 120.

If the request for authorization is declined, the merchant 120 is notified as such, and may request authorization from the acquirer 130 for a lesser amount or request an alternative form of payment from the cardholder 160. If the request for authorization is approved, an authorization code is issued to the merchant 120, and the cardholder's available credit line or account balance is decreased. The financial transaction is then settled between the merchant 120, the acquirer 130, the issuer 140, and/or the cardholder 160. Settlement typically includes the acquirer 130 reimbursing the merchant 120 for selling the good or service, and the issuer 140 reimbursing the acquirer 130 for reimbursing the merchant 120. When a credit card is used, the issuer 140 may bill the cardholder 160 to settle a financial account associated with the cardholder 160. When a debit or prepaid card is used, the issuer 140 may automatically withdraw funds from the account.

Figure 2:
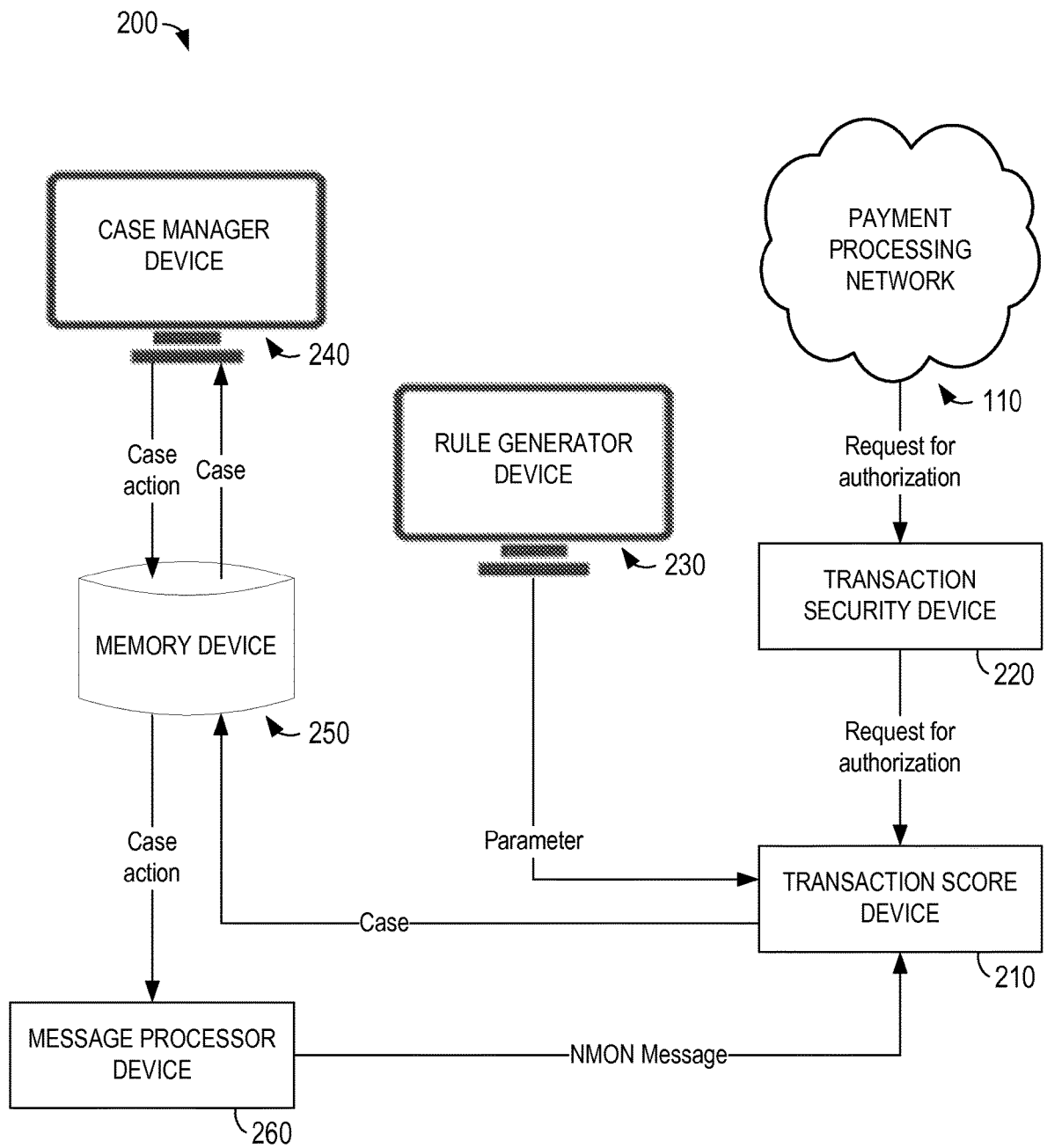
FIG. 2 is a block diagram illustrating an example system for feeding one or more previous case actions for a decision of confirming one or more financial transactions.

FIG. 2 is a block diagram illustrating an example system 200 for feeding one or more previous case actions for a decision of confirming one or more financial transactions in the environment 100 (shown in FIG. 1). A request for authorization of a financial transaction is received at a transaction score device 210 (e.g., a scoring server) via a processing network 110. As described above, the processing network 110 may be a MASTERCARD® brand payment processing network.

In some embodiments, the system 200 includes a security mechanism, e.g., transaction security device 220, that determines whether the request for authorization is routed to the transaction score device 210. For example, if the request for authorization is associated with a cardholder account (e.g., a first cardholder account) that is enrolled in a security system (e.g., a fraud management system), the request for authorization may be routed or transmitted to the transaction score device 210. If the request for authorization is associated with a cardholder account that is not enrolled in a security system or is enrolled in a security system that is not associated with the transaction score device 210, the request for authorization may be routed or transmitted to another financial transaction processing computing device.

The transaction score device 210 is configured to receive the request for authorization and determine whether to approve, flag, or decline the request for authorization. In some embodiments, the transaction score device 210 calculates or generates a transaction score (e.g., a first score) for a financial transaction based on one or more parameters (e.g., first parameters) associated with the cardholder account. For example, the parameters may be risk-related parameters that are used to identify or assign a likelihood of fraud, and the transaction score may be indicative of a riskiness of authorizing a financial transaction, where a lower score (e.g., 1) is associated with less risk and a higher score (e.g., 10) is associated with more risk (e.g., on a ten-point scale).

A financial transaction includes or is associated with one or more elements or factors including, without limitation, a transaction date, a transaction time, a merchant, a geolocation, a transaction amount, a quantity of products, a type of product, a shipment method, and/or any other factor that may be used to determine whether to authorize a financial transaction. A cardholder account is associated with one or more parameters that set or define one or more boundaries or thresholds of expected cardholder behavior. A rule generator device 230 may generate one or more parameters and transmit the one or more parameters to the transaction score device 210. In some embodiments, at least one parameter is generated based on user (e.g., cardholder 160) input. The transaction score device 210 compares the factors associated with the financial transaction with the parameters associated with the cardholder account to determine whether the financial transaction falls within or outside of expected cardholder behavior and identify or assign a likelihood of fraud.

For example, a financial transaction originating in a first geolocation that is different from a second geolocation associated with the cardholder account may be identified to indicate a high likelihood of fraud (e.g., the first geolocation is more than a predetermined distance from a mailing address associated with the cardholder account or from a geolocation of a previous financial transaction). For another example, a financial transaction for a first transaction amount that is different from a second transaction amount associated with the cardholder account may be identified to indicate a high likelihood of fraud (e.g., the first transaction amount is more than an average account balance or many times more than an average transaction amount).

A request for authorization may be automatically approved (e.g., approved without prompting a user, e.g., cardholder 160, to confirm and/or verify the financial transaction) when the request is associated with a financial transaction that has a transaction score that satisfies a first predetermined threshold (e.g., the transaction score is less than or equal to the first predetermined threshold). On the other hand, the request for authorization may be automatically declined (e.g., declined without prompting a user, e.g., cardholder 160, to confirm and/or verify the financial transaction) when the request is associated with a financial transaction that has a transaction score that does not satisfy a second predetermined threshold (e.g., the transaction score is greater than or equal to the second predetermined threshold). In some embodiments, the transaction score device 210 is configured to flag the request for authorization when the request is associated with a financial transaction that has a transaction score between the first predetermined threshold and the second predetermined threshold (e.g., the transaction score is greater than the first predetermined threshold and less than the second predetermined threshold). Alternatively, the request for authorization may be flagged when the request is associated with a financial transaction that has a transaction score above the first predetermined threshold (e.g., no request for authorization is automatically declined).

A flagged request for authorization is indicative of a potentially fraudulent financial transaction that requires additional analysis or attention to approve and/or decline a request for authorization. For example, the transaction score device 210 may generate a case for a flagged request and transmit the case to a case manager device 240. In some embodiments, the transaction score device 210 transmits the case to a memory device 250, in which one or more cases are stored, and the case manager device 240 retrieves one or more cases from the memory device 250.

A user (e.g., cardholder 160) may confirm or verify whether the financial transaction is legitimate or illegitimate via the case manager device 240. For example, the case manager device 240 may automatically communicate with the cardholder 160 via telephone, text message, or electronic mail (email) to generate a case action confirming or verifying a legitimacy or illegitimacy of the financial transaction. Additionally or alternatively, the case manager device 240 may receive input from another user (e.g., a case manager) communicating with the cardholder 160 (e.g., via telephone, text message, or email) to generate the case action. If the financial transaction is confirmed or verified as an illegitimate financial transaction, the request for authorization is declined. If the financial transaction is processed (e.g., the request for authorization was approved) and the financial transaction is confirmed or verified as an illegitimate financial transaction, a chargeback (e.g., a return of funds associated with the financial transaction) may be processed. If the request for authorization is confirmed or verified as a legitimate financial transaction, the request for authorization is approved.

The case manager device 240 transmits one or more case actions to a message processor device 260, where one or more non-monetary (NMON) messages are generated based on the one or more case actions. In some examples, the case manager device 240 transmits the case action to the memory device 250, in which one or more case actions are stored, and the message processor device 260 retrieves one or more case actions from the memory device 250. The message processor device 260 is configured to generate one or more non-monetary (NMON) messages based on the one or more case actions. The NMON messages are transmitted to the transaction score device 210, which may consume the NMON messages and update (e.g., modify, edit) one or more parameters associated with the cardholder account based on the NMON messages such that factors associated with a subsequent financial transaction are compared with the updated parameters to determine whether the subsequent financial transaction falls within or outside of expected cardholder behavior. The NMON messages may be associated with a code used to update the one or more parameters. In some embodiments, the transaction score device 210 may communicate with the rule generator device 230 to update one or more parameters based on one or more case actions.

Figure 3:
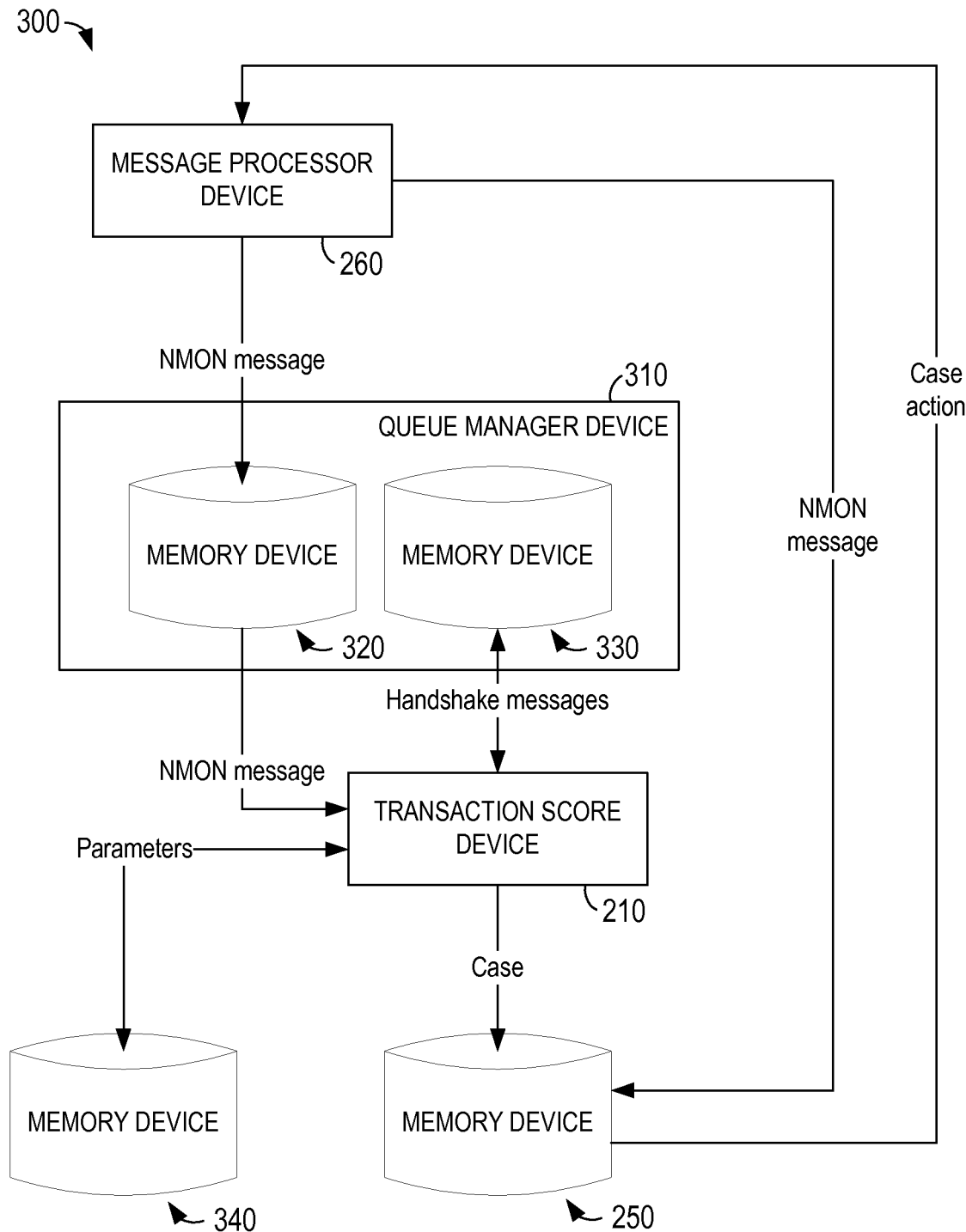
FIG. 3 is a block diagram illustrating an example system for processing one or more non-monetary messages.

FIG. 3 is a block diagram illustrating an example system 300 for processing one or more NMON messages in the environment 100 (shown in FIG. 1). A transaction score device 210 is configured to generate a case and transmit the case to a memory device 250. Additionally or alternatively, one or more cases may be transmitted to a case manager device 240 (shown in FIG. 2). In some embodiments, at least some cases transmitted to the memory device 250 and/or to the case manager device 240 are selectively transmitted using a filtering mechanism based on one or more criteria (e.g., time frame, case status). The case manager device 240 may process the case to generate a case action (e.g., an action for a closed case, an action for an active case) and transmit the case action to the memory device 250.

The message processor device 260 is configured to retrieve one or more case actions from the memory device 250. Additionally or alternatively, one or more case actions may be received and/or retrieved from a case manager device 240. In some embodiments, at least some case actions received and/or retrieved from the memory device 250 and/or from the case manager device 240 are selectively retrieved using a filtering mechanism based on one or more criteria (e.g., time frame, case status).

The message processor device 260 processes the one or more case actions and generates one or more NMON messages based on the one or more case actions. In some embodiments, the NMON messages are associated with a code used to update one or more parameters associated with a cardholder account. One or more NMON messages are transmitted to a queue manager device 310 or, more specifically, a message queue (e.g., a memory device 320) of the queue manager device 310. In some embodiments, the NMON message, or a copy of the NMON message, is also transmitted to the memory device 250 and associated with the corresponding case action.

A transaction score device 210 listens to the message queue and receives and/or retrieves one or more NMON messages from the memory device 320. In some embodiments, one or more handshake messages are transmitted between the transaction score device 210 and the queue manager device 310 or, more specifically, a memory device 330 to facilitate communication between the transaction score device 210 and the queue manager device 310 (e.g., to determine whether a cardholder account is enrolled in a security system).

The transaction score device 210 consumes the NMON message and identifies one or more parameters associated with a likelihood of fraud that is inconsistent with a case action (e.g., a parameter used to identify a high likelihood of fraud for a financial transaction that was confirmed to be a legitimate financial transaction, a parameter used to identify a low likelihood of fraud for a financial transaction that was confirmed to be an illegitimate financial transaction). The transaction score device 210 is configured to determine an update (e.g., modification, edit) to at least some of the identified parameters based on the associated likelihood of fraud and/or the case action. In some examples, the transaction score device 210 retrieves one or more parameters from a cardholder account database (e.g., a memory device 340), updates the one or more parameters, and/or transmits the updated parameters to the memory device 340.

For example, a parameter used to associate a factor with a high likelihood of fraud for a financial transaction that was confirmed as a legitimate financial transaction may be updated such that a comparison of the factor with the updated parameter would not result in an identification of a high likelihood of fraud or would result in an identification of a likelihood of fraud that is less than a high likelihood of fraud (e.g., a medium likelihood of fraud, a low likelihood of fraud). For another example, a parameter used to associate a factor with a low likelihood of fraud for a financial transaction that was confirmed as an illegitimate financial transaction may be updated such that a comparison of the factor with the updated parameter would not result in an identification of a low likelihood of fraud or would result in an identification of a likelihood of fraud that is greater than a low likelihood of fraud (e.g., a medium likelihood of fraud, a high likelihood of fraud). In this manner, a subsequent financial transaction associated with a subsequent factor that is the same as or substantially similar to a previous factor associated with a previous likelihood of fraud that is inconsistent with a previous case action may be processed such that a subsequent likelihood of fraud associated with the subsequent factor is consistent with a subsequent case action, if a subsequent case is generated.

In some embodiments, a parameter used to associate a factor with a high likelihood of fraud for a financial transaction that was verified as an illegitimate financial transaction may be maintained and/or updated such that a comparison of the factor (or a factor less-likely to be associated with a high likelihood of fraud) with the maintained and/or updated parameter would result in an identification of a high likelihood of fraud. Additionally or alternatively, a parameter used to associate a factor with a low likelihood of fraud for a financial transaction that was verified as a legitimate financial transaction may be maintained and/or updated such that a comparison of the factor (or a factor less-likely to be associated with a low likelihood of fraud) with the maintained and/or updated parameter would result in an identification of a low likelihood of fraud.

Figure 4:
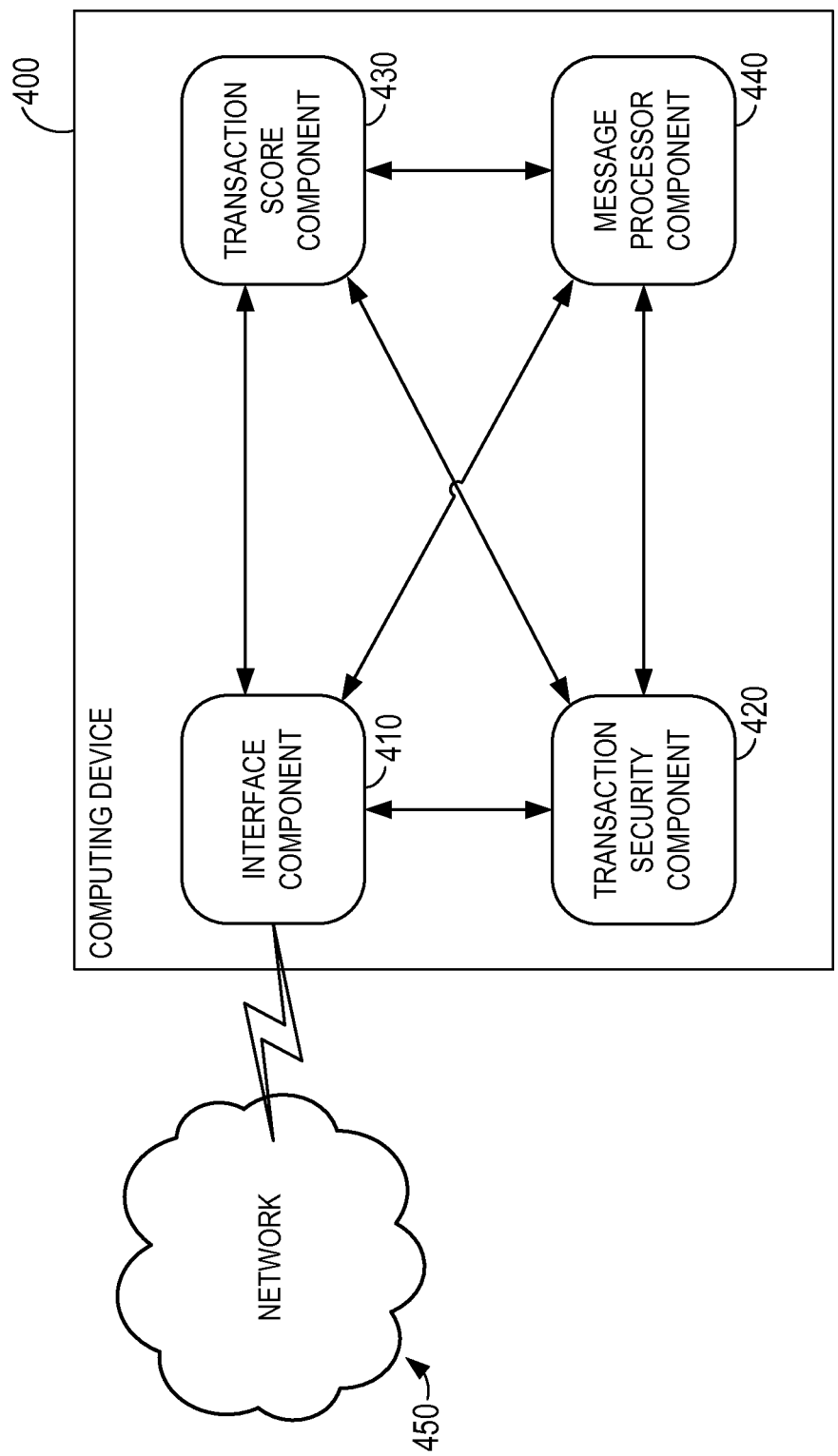
FIG. 4 is a block diagram illustrating example modules that may be used to feed one or more previous case actions for a decision of confirming one or more financial transactions.

FIG. 4 is a block diagram illustrating example modules that may be used to feed one or more previous case actions for a decision of confirming one or more financial transactions in the environment 100 (shown in FIG. 1) using a computing device 400. In some embodiments, the computing device 400 is associated with the issuer 140. Alternatively, the computing device 400 may be associated with any entity that enables the environment 100 to function as described herein. The computing device 400 includes an interface component 410, a transaction security component 420, a transaction score component 430, and/or a message processor component 440.

The interface component 410 enables the computing device 400 to receive data from and/or transmit data to another device, such as a financial transaction processing computing device, a rule generator device 230 (shown in FIG. 2), and/or a case manager device 240 (shown in FIG. 2). In some embodiments, the interface component 410 receives data from and/or transmits data to another device via a network 450 (e.g., a local area network, a wide area network, the Internet).

The interface component 410 is coupled to and/or communicates with the transaction security component 420, the transaction score component 430, and/or the message processor component 440 to facilitate communication between the transaction security component 420, the transaction score component 430, and/or the message processor component 440 and another device (e.g., a financial transaction processing computing device, a rule generator device 230, a case manager device 240). For example, the interface component 410 may receive a request for authorization of a financial transaction from a financial transaction processing computing device, receive a parameter associated with a cardholder account from a rule generator device 230, transmit a case associated with a flagged request for authorization to a case manager device 240, and/or receive a case action verifying a legitimacy or illegitimacy of a financial transaction from a case manager device 240.

The transaction security component 420 is configured to communicate with the interface component 410, and determine whether a request for authorization is routed to the transaction score component 430 such that the request for authorization may be approved, flagged, or declined at the transaction score component 430 based on one or more parameters associated with a cardholder account. On condition that the request for authorization is associated with a cardholder account that is enrolled in a predetermined security system associated with the transaction score component 430, the transaction security component 420 is configured to route or transmit the request for authorization to the transaction score component 430. On condition that the request for authorization is associated with a cardholder account that is not enrolled in a security system or is enrolled in a security system that is not associated with the transaction score component 430, the transaction security component 420 is configured to route or transmit the request for authorization to another device (e.g., via the interface component 410).

The transaction score component 430 is configured to communicate with the interface component 410, identify one or more parameters associated with a cardholder account, and determine whether to approve a request for authorization of a financial transaction based on the one or more identified parameters. In some embodiments, the transaction score component 430 is configured to calculate or generate a transaction score associated with a financial transaction based on one or more parameters, and determine whether the transaction score satisfies a predetermined threshold. On condition that the transaction score satisfies the predetermined threshold, the request for authorization is automatically approved (e.g., approved without prompting a user to confirm and/or verify the financial transaction). On condition that the transaction score does not satisfy the predetermined threshold, an instruction to prompt the cardholder 160 to confirm or verify the financial transaction is transmitted to another device (e.g., via the interface component 410) that is configured to prompt the cardholder 160. Upon receiving a confirmation of the financial transaction, the request for authorization is approved. On the other hand, upon receiving a declination of the financial transaction, the request for authorization is declined.

In some examples, a confirmation may not be received within a predetermined amount of time. For example, a request to confirm or decline the financial transaction may be presented to the cardholder 160 after the request for authorization is automatically processed (e.g., approved, declined). If the request for authorization is automatically declined and then a confirmation that the financial transaction was an illegitimate transaction is received, one or more parameters associated with the cardholder account may be modified (e.g., be associated with a greater weight to ensure that the same decision is made for a subsequent financial transaction having one or more factors that are the same as or substantially similar to the factors associated with the financial transaction). If the request for authorization is automatically declined and then a confirmation that the financial transaction was a legitimate transaction is received, a request to enter into a financial transaction may be transmitted to another device (e.g., a merchant device, a cardholder device). If the request for authorization is automatically approved and then a confirmation that the financial transaction was an illegitimate transaction is received, a chargeback is processed to return the funds associated with the financial transaction. If the request for authorization is automatically approved and then a confirmation that the financial transaction was a legitimate transaction is received, one or more parameters associated with the cardholder account may be modified (e.g., be associated with a greater weight to ensure that the same decision is made for a subsequent financial transaction having one or more factors that are the same as or substantially similar to the factors associated with the financial transaction).

The message processor component 440 is configured to communicate with the interface component 410, process a case action associated with a financial transaction, and generate an NMON message for transmission to the transaction score component 430. The NMON message is configured to enable a transaction score component 430 to generate and/or update one or more parameters based on one or more factors associated with a financial transaction, one or more likelihoods of fraud, and/or a case action. On condition that a request for authorization is approved, one or more first parameters are updated and/or one or more second parameters are generated based on the factors associated with the financial transaction such that a request for authorization of a subsequent financial transaction is analyzable using the one or more updated first parameters and/or the one or more generated second parameters. On condition that the request for authorization is not approved, one or more parameters are maintained such that a request for authorization of a subsequent financial transaction is analyzable using the one or more maintained parameters.

Figure 5:
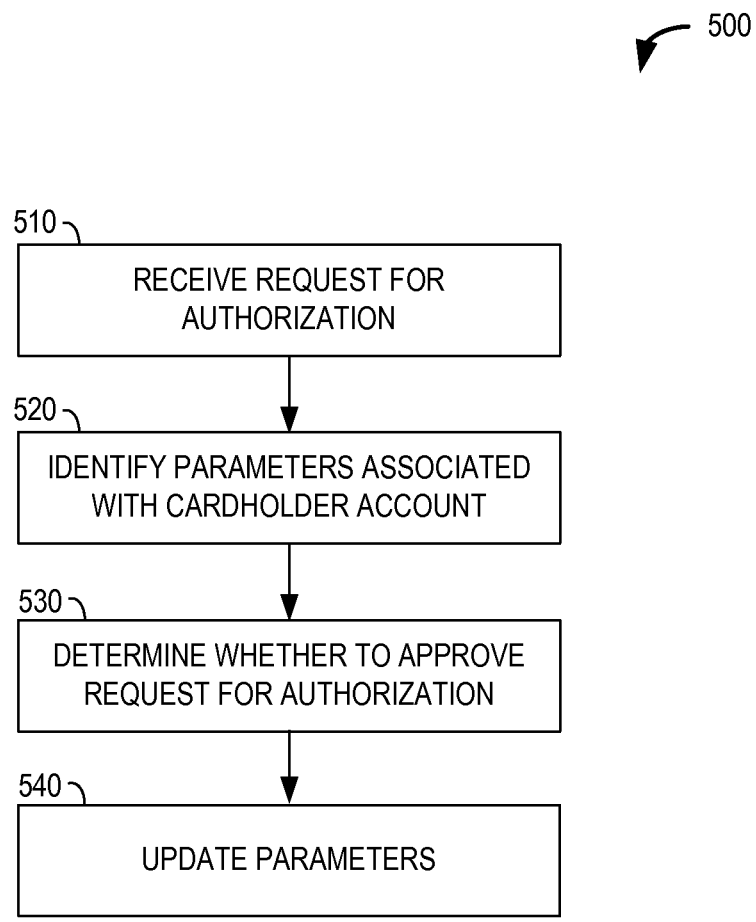
FIG. 5 is a flowchart of an example method of generating one or more feeding one or more previous case actions for a decision of confirming one or more financial transactions.

FIG. 5 is a flowchart of an example method 500 of feeding one or more previous case actions for a decision of confirming one or more financial transactions in the environment 100 (shown in FIG. 1) using the computing device 400 (shown in FIG. 2). The computing device 400 receives at 510 a request for authorization of a financial transaction. In some embodiments, the request for authorization is transmitted from a financial transaction processing computing device. Alternatively, the request for authorization may be transmitted from any device that enables the environment 100 to function as described herein. The financial transaction includes or is associated with one or more factors including, without limitation, a transaction date, a transaction time, a merchant, a geolocation, a transaction amount, a quantity of products, a type of product, a shipment method, and/or any other factor that may be used to determine whether to approve a financial transaction.

One or more parameters associated with a cardholder account is identified at 520. The computing device determines at 530 whether to approve, flag, or decline the request for authorization based on the one or more identified parameters. For example, the factors are compared with the parameters to identify or assign one or more likelihoods of fraud, and generate a transaction score to determine whether the financial transaction falls within or outside of expected cardholder behavior. On condition that the request for authorization and/or the corresponding financial transaction are flagged and the financial transaction is confirmed or verified by a cardholder 160, the one or more parameters are updated at 540 such that a request for authorization for a subsequent financial transaction is analyzable using the one or more updated parameters.

Figure 6:
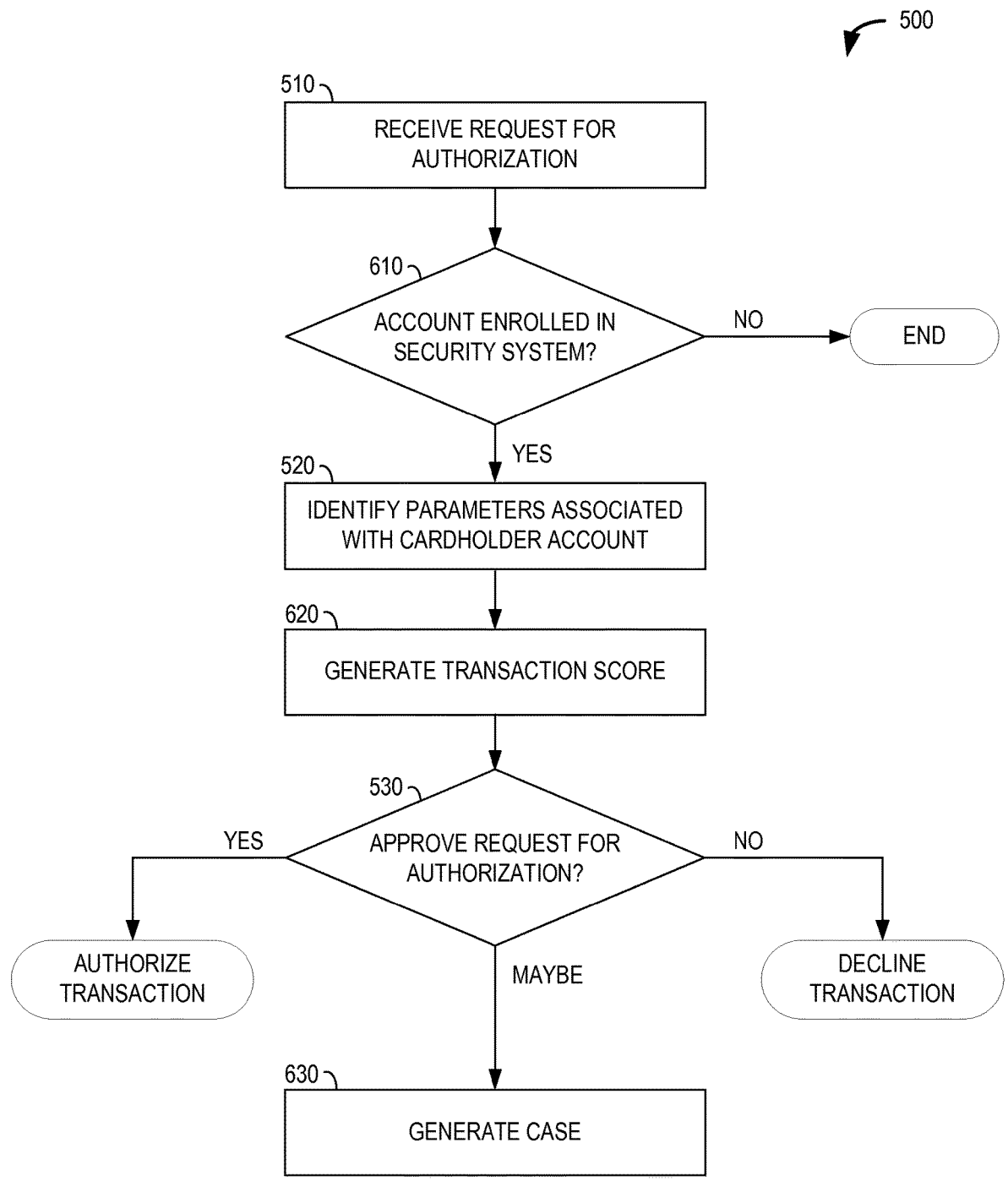
FIG. 6 is a detailed flowchart of an example method of generating one or more case actions for one or more financial transactions.
Figure 7:
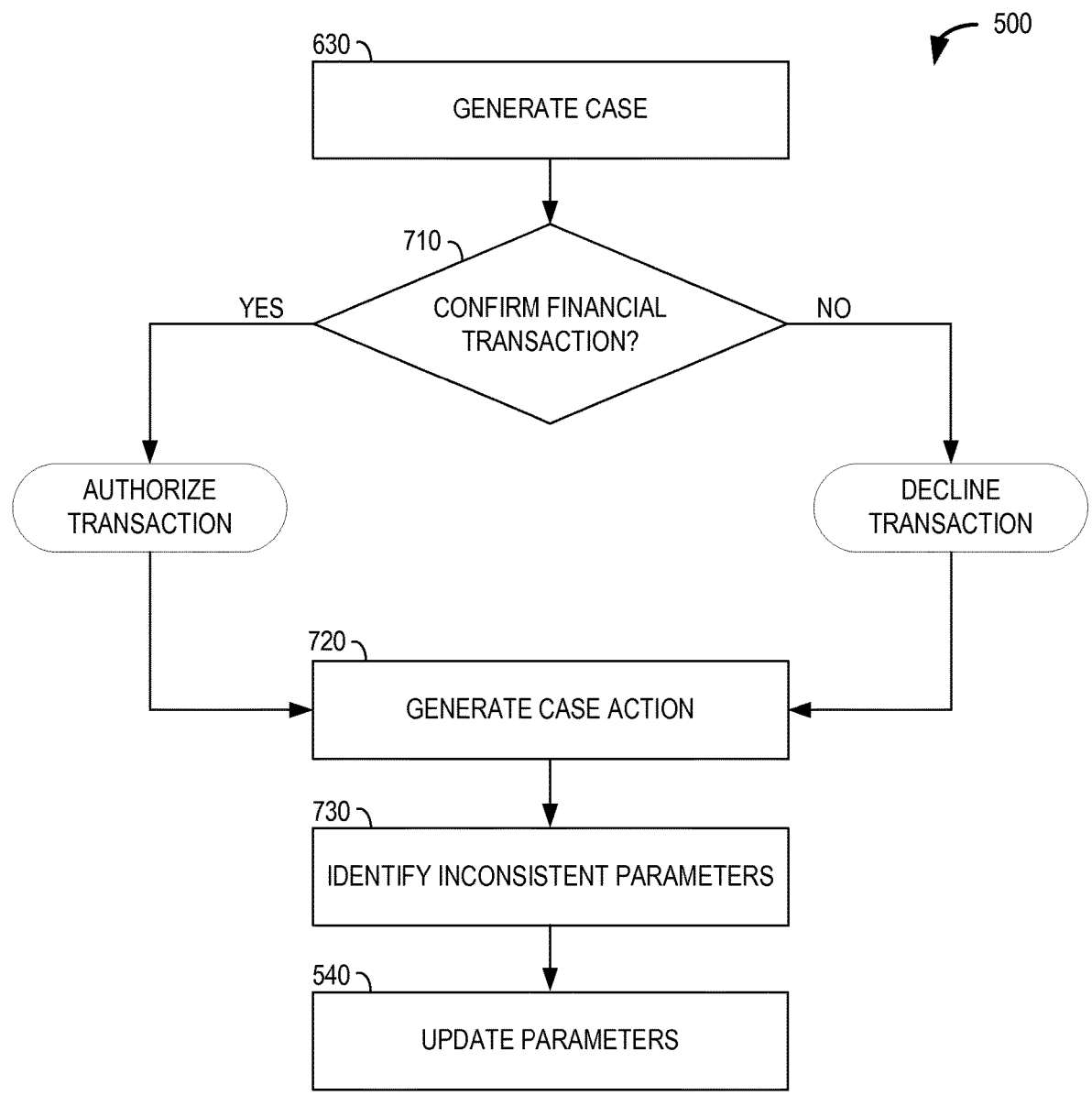
FIG. 7 is a detailed flowchart of an example method of feeding one or more previous case actions for a decision of confirming one or more financial transactions.

FIGS. 6 and 7 are detailed flowcharts of portions of the method 500. Referring to FIG. 6, a request for authorization of a financial transaction is received at 510 via a processing network 110. As described above, the processing network 110 may be a MASTERCARD® brand payment processing network. In some embodiments, the computing device 400 determines whether a cardholder account associated with the request for authorization is enrolled in a security system. If the cardholder account is not enrolled in a security system, the request for authorization is routed or transmitted to another computing device.

If the cardholder system is enrolled in the security system, one or more parameters associated with the cardholder account are identified at 520. For example, the parameters may be risk-related parameters that are used to identify or assign a likelihood of fraud. Based on the one or more identified parameters, a transaction score indicative of a riskiness of authorizing the financial transaction is generated at 620. For example, one or more factors associated with a financial transaction (e.g., a transaction date, a transaction time, a merchant, a geolocation, a transaction amount, a quantity of products, a type of product, a shipment method) are compared with the one or more identified parameters to determine one or more likelihoods of fraud and generate the transaction score.

Based on the generated transaction score, the computing device 400 determines at 530 whether to approve, flag, or decline the request for authorization based on the transaction score. If the transaction score satisfies a first predetermined threshold, the request for authorization is automatically approved (e.g., approved without prompting a user to confirm and/or verify the financial transaction). On the other hand, if the transaction score does not satisfy a second predetermined threshold, the request for authorization is automatically declined (e.g., declined without prompting a user to confirm and/or verify the financial transaction). If the transaction score is between the first threshold and the second threshold, the request for authorization is flagged, and a case associated with the flagged request for authorization is generated at 630.

Referring to FIG. 7, a case associated with a flagged request for authorization is generated at 630, and a user (e.g., cardholder 160) is prompted at to confirm or verify at 710 whether the financial transaction is legitimate or illegitimate. If the financial transaction is declined as a legitimate financial transaction or confirmed as an illegitimate financial transaction, the request for authorization is declined and/or a chargeback is processed. On the other hand, if the request for authorization is confirmed as a legitimate financial transaction, the request for authorization is approved.

A case action and a corresponding NMON message are generated at 720 based on the user response to the financial transaction confirmation request, and the NMON message is consumed to identify at 730 one or more parameters used to determine one or more likelihoods of fraud that is inconsistent with a case action (e.g., a parameter used to identify a high likelihood of fraud for a financial transaction that was verified to be a legitimate financial transaction, a parameter used to identify a low likelihood of fraud for a financial transaction that was verified to be an illegitimate financial transaction). The computing device 400 determines an update (e.g., modification, edit) to at least some of the identified parameters based on the associated likelihood of fraud and/or the case action, and updates at 540 one or more parameters such that factors associated with a subsequent financial transaction are compared with the updated parameters to determine whether the subsequent financial transaction falls within or outside of expected cardholder behavior.

FIG. 8 is a block diagram illustrating an example computing device 800 that may be used to feed one or more previous case actions for a decision of confirming one or more financial transactions in the environment 100 (shown in FIG. 1). While some embodiments of the disclosure are illustrated and described herein with reference to the computing device 800 being or including a computing device 400 (shown in FIG. 4), aspects of the disclosure are operable with any computing device (e.g., transaction score device 210, transaction security device 220, rule generator device 230, case manager device 240, message processor device 260, queue manager device 310) that executes instructions to implement the operations and functionality associated with the computing device 800.

For example, the computing device 800 may include a mobile device, a mobile telephone, a phablet, a tablet, a portable media player, a netbook, a laptop, a desktop computer, a computing pad, a kiosk, a tabletop device, an industrial control device, and other computing devices. The computing device 800 may represent a group of processing units or other computing devices. Additionally, any computing device described herein may be configured to perform any operation described herein including one or more operations described herein as being performed by another computing device.

The computing device 800 includes one or more computer-readable media, such as a memory area 810 storing computer-executable instructions, cardholder account information (e.g., parameters, preferences, rules, thresholds), case information (e.g., case data, case action data), message data, security data, enrollment data, and other data, and one or more processors 820 programmed to execute the computer-executable instructions for implementing aspects of the disclosure. For example, the memory area 810 may include an interface component 410 (shown in FIG. 4), a transaction security component 420 (shown in FIG. 4), a transaction score component 430 (shown in FIG. 4), and/or a message processor component 440 (shown in FIG. 4). The memory area 810 includes any quantity of media associated with or accessible by the computing device 800. The memory area 810 may be internal to the computing device 800 (as shown in FIG. 8), external to the computing device 800 (not shown), or both (not shown).

The processor 820 includes any quantity of processing units, and the instructions may be performed by the processor 820 or by multiple processors within the computing device 800 or performed by a processor external to the computing device 800. The processor 820 is programmed to execute instructions such as those illustrated in the figures (e.g., FIGS. 5, 6, and/or 7).

Upon programming or execution of these instructions, the processor 820 is transformed into a special purpose microprocessor or machine. For example, the interface component 410, when executed by the processor 820, causes the processor 820 to receive a request for authorization of a financial transaction, receive or retrieve one or more parameters associated with a cardholder account, transmit a case, prompt a cardholder to confirm the request for authorization, receive a confirmation of the request for authorization, and receive or retrieve at least one case action; the transaction security component 420, when executed by the processor 820, causes the processor 820 to determine whether a cardholder account is associated with a security mechanism; the transaction score component 430, when executed by the processor 820, causes the processor 820 to identify one or more parameters associated with the cardholder account, generate a score associated with the financial transaction, determine whether to approve the request for authorization, approve the request for authorization, update the one or more parameters, generate one or more parameters, and maintain the one or more parameters; and the message processor component 440, when executed by the processor 820, causes the processor 820 to generate a non-monetary message. Although the processor 820 is shown separate from the memory area 810, embodiments of the disclosure contemplate that the memory area 810 may be onboard the processor 820 such as in some embedded systems.

The computing device 800 includes at least one user interface 830 for exchanging data between the computing device 800 and a user 840. For example, the user interface 830 includes or is coupled to a presentation device configured to present information, such as text, images, audio, video, graphics, alerts, and the like, to the user 840. The presentation device may include, without limitation, a display, a speaker, or a vibrating component. Additionally or alternatively, the user interface 830 may include or be coupled to an input device (not shown) configured to receive information, such as user commands, from the user 840. The input device may include, without limitation, a controller, a camera, a microphone, or an accelerometer. In at least some embodiments, the presentation device and the input device are integrated in a common user interface 830 configured to present information to the user 840 and receive information from the user 840. For example, the user-interface device may include, without limitation, a capacitive touch screen display or a controller including a vibrating component. In some embodiments, the user 840 may interface with the computing device 800 via another computing device.

The computing device 800 includes at least one communication interface 850 for exchanging data between the computing device 800 and a computer-readable media or another computing device. For example, the computing device 800 may be coupled to a server, a financial transaction processing computing device, a financial transaction device (e.g., a POS terminal), a rule generator device 230, a case manager device 240, and/or a user device via a network and/or the Internet. Communication between the computing device 800 and a computer-readable media or another computing device may occur using any protocol or mechanism over any wired or wireless connection.

The block diagram of FIG. 8 is merely illustrative of an example system that may be used in connection with one or more embodiments of the disclosure and is not intended to be limiting in any way. Further, peripherals or components of the computing devices known in the art are not shown, but are operable with aspects of the disclosure. At least a portion of the functionality of the various elements in FIG. 8 may be performed by other elements in FIG. 8, or an entity (e.g., processor, web service, server, applications, computing device, etc.) not shown in FIG. 8.

The subject matter described herein enables one or more financial transactions to be confirmed and/or verified based on one or more previous case actions. One or more factors associated with a financial transaction are identified and used to update one or more parameters associated with a cardholder account such that a subsequent financial transaction may be analyzed using the one or more updated parameters. In this manner, a financial transaction having one or more factors that are the same as or similar to one or more factors associated with a previous financial transaction that has been confirmed and/or verified by a cardholder may be automatically confirmed and/or verified without prompting the cardholder to confirm and/or verify the financial transaction.

Example computer-readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Example computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an example computing system environment, embodiments of the disclosure are capable of implementation with numerous other general purpose or special purpose computing system environments, configurations, or devices.

Embodiments of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, earphones, and the like), network PCs, minicomputers, mainframe computers, distributed computing environments that include any of the above systems or devices, and the like. Such systems or devices may accept input from the cardholder in any way, including from input devices such as a keyboard or pointing device, via gesture input, proximity input (such as by hovering), and/or via voice input.

Embodiments of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

The embodiments illustrated and described herein as well as embodiments not specifically described herein but within the scope of aspects of the disclosure constitute example means for evaluating a credibility of a merchant. For example, the elements illustrated in FIG. 1, 2, 3, 4, or 8 such as when encoded to perform the operations illustrated in FIG. 5, 6, or 7 constitute at least an example means for receiving a request for authorization of a financial transaction (e.g., interface component 410), an example means for identifying one or more parameters associated with a cardholder account (e.g., transaction score component 430), an example means for determining whether to approve a request for authorization (e.g., transaction score component 430), and/or an example means for updating one or more parameters (e.g., transaction score component 430, rule generator device 230).

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. Furthermore, references to an "embodiment" or "example" of the present disclosure are not intended to be interpreted as excluding the existence of additional embodiments or examples that also incorporate the recited features. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

In some embodiments, the operations illustrated in the drawings may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various embodiments with their associated operations, a person skilled in the art would appreciate that a combination of operations from any number of different embodiments is also within scope of the aspects of the disclosure.

What is claimed is:

1. A computer-implemented method for improving operating system (OS) resource allocation, performed by a processor operationally coupled to one or more memory devices, the computer implemented method comprising:

receiving, via an interface component, from a financial transaction processing computing device, a first request for authorization of a first financial transaction associated with a cardholder account, wherein one or more first factors are associated with the first financial transaction, the one or more first factors comprising a geolocation of origin of the first financial transaction;

determining whether the cardholder account is enrolled in a security system;

upon determining that the cardholder account is enrolled in the security system, identifying one or more parameters associated with the cardholder account, the one or more parameters assigning a likelihood of a fraud associated with the first request for authorization;

determining that the geolocation of the origin of the first financial transaction is different from a geolocation associated with the cardholder account;

based on the determination that the geolocation of the origin of the first financial transaction is different from the geolocation associated with the cardholder account, referring the first request to the user to verify a legitimacy or an illegitimacy of the first request;

based on the identified one or more parameters, reducing processor load of the financial transaction processing computing device at least by automatically approving the first request;

upon receiving a reply to the referral after the automatic approval of the first request and the reply comprising information that the first financial transaction was an illegitimate transaction, automatically processing a chargeback to the user, and updating the one or more parameters, such that the updated one or more parameters assign a high likelihood of fraud to a subsequent financial transaction at least in cases where a geolocation of origin of the subsequent financial transaction is different from the geolocation associated with the cardholder account; and based on the one or more updated parameters, reducing the processor load by at least reducing the number of requests to confirm a potentially fraudulent financial transaction by automatically declining a subsequent request for authorization of the subsequent financial transaction without prompting the cardholder to verify the subsequent financial transaction.

2. The computer-implemented method of claim 1 further comprising reducing network bandwidth usage at least by using the one or more updated parameters for processing subsequent financial transactions.

3. The computer-implemented method of claim 1, wherein determining whether to approve the first request for authorization further comprises:

generating a first score associated with the first financial transaction;

on condition that the first score lies between a first threshold and a second threshold, the second threshold being more than the first threshold, flagging the first request for authorization as potentially fraudulent without approving the first request for authorization; and performing additional analysis of the first request to determine whether to approve the first request or deny the first request.

4. The computer-implemented method of claim 1 further comprising: upon the first request for the first financial transaction being automatically approved and a confirmation that the first financial transaction was legitimate being received later, reducing an error rate at least by updating the one or more parameters, causing a same decision to be made for a subsequent financial transaction when the subsequent financial transaction has same one or more first factors associated with the subsequent financial transaction.

5. The computer-implemented method of claim 3, wherein performing additional analysis of the first request to determine whether to approve the first request or deny the first request comprises:

automatically communicating with the cardholder and requesting a verification of a legitimacy of the first request; and approving or denying the first request based on input from the cardholder.

6. The computer-implemented method of claim 1, wherein determining whether to approve the first request for authorization comprises, on condition that the first request for authorization is not approved, maintaining the one or more parameters such that the second request for authorization of the second financial transaction is analyzable based on the one or more maintained parameters.

7. The computer-implemented method of claim 1, wherein updating the one or more parameters comprises generating one or more second parameters and using the one or more generated second parameters for analyzing a third request for a third financial transaction.

8. A computing device for improving operating system (OS) resource allocation, the computing device comprising:

a memory storing data associated with one or more cardholder accounts, and computer-executable instructions, the memory comprising a first memory device and a second memory device; and a processor configured to execute the computer-executable instructions to:

receive, via an interface, from a financial transaction processing computing device, a first request for authorization of a first financial transaction associated with a cardholder account, wherein one or more first factors are associated with the first financial transaction, the one or more first factors comprising a geolocation of origin of the first financial transaction;

determine whether the cardholder account is enrolled in a predetermined security system;

upon determining that the cardholder account is enrolled in the predetermined security system, identify one or more parameters associated with a cardholder account of the one or more cardholder accounts stored in the memory, the one or more parameters assigning a likelihood of a fraud associated with the first request for authorization, determine that the geolocation of the origin of the first financial transaction is different from a geolocation associated with the cardholder account;

based on the determination that the geolocation of the origin of the first financial transaction is different from the geolocation associated with the cardholder account, refer the first request to the user to verify a legitimacy or an illegitimacy of the first request;

based on the identified one or more parameters, reduce processor load of the financial transaction processing computing device at least by automatically approving the first request;

upon receiving a reply to the referral after the automatic approval of the first request and the reply comprising information that the first financial transaction was an illegitimate transaction, automatically process a chargeback to the user, and update the one or more parameters, such that the updated one or more parameters assign a high likelihood of fraud to a subsequent financial transaction at least in cases where a geolocation of origin of the subsequent financial transaction is different from the geolocation associated with the cardholder account; and based on the updated one or more parameters, reduce the processor load by at least reducing the number of requests to confirm a potentially fraudulent financial transaction by automatically declining a subsequent request for authorization of the subsequent financial transaction without prompting the cardholder to verify the subsequent financial transaction.

9. The computing device of claim 8, wherein the processor is further configured to execute the computer-executable instructions to reduce network bandwidth usage at least by using the one or more updated parameters for processing subsequent financial transactions.

10. The computing device of claim 8, wherein the processor is further configured to execute the computer-executable instructions to:
    retrieve, from the memory, at least one case action associated with at least one financial transaction of the one or more financial transactions, the at least one financial transaction associated with one or more factors; and
    generate the one or more parameters based on the one or more factors associated with the at least one financial transaction.

11. The computing device of claim 8, wherein the processor is further configured to execute the computer-executable instructions to: upon the first request for the first financial transaction being automatically approved and a confirmation that the first financial transaction was legitimate being received later, reduce an error rate by updating the one or more parameters causing a same decision to be made for a subsequent financial transaction when the subsequent financial transaction has same one or more first factors associated with the subsequent financial transaction.

12. The computing device of claim 8, wherein the processor is further configured to execute the computer-executable instructions to:
    generate a first score associated with the first financial transaction;
    on condition that the first score lies between a first threshold and a second threshold, the second threshold being more than the first threshold, flag the first request for authorization as potentially fraudulent without approving the first request for authorization; and
    perform additional analysis of the first request to determine whether to approve the first request or deny the first request.

13. The computing device of claim 12, wherein performing additional analysis of the first request to determine whether to approve the first request or deny the first request comprises:
    automatically communicating with the cardholder and requesting verification of a legitimacy of the first request; and
    approving or denying the first request based on input from the cardholder.

14. The computing device of claim 8, wherein the processor is further configured to execute the computer-executable instructions to, on condition that the first request for authorization is not approved, maintain the one or more parameters such that the second request for authorization of the second financial transaction is analyzable based on the one or more maintained parameters.

15. The computing device of claim 8, wherein updating the one or more parameters comprises generating one or more second parameters and using the one or more generated second parameters for analyzing a third request for a third financial transaction.

16. A computer-readable storage device having computer-executable instructions embodied thereon, wherein, upon execution by at least one processor operationally coupled a memory, the computer-executable instructions cause the processor to:
    receive, via an interface component, from a financial transaction processing computing device, a first request for authorization of a first financial transaction associated with a cardholder account, wherein one or more first factors are associated with the first financial transaction, the one or more first factors comprising a geolocation of origin of the first financial transaction;
    determine whether the cardholder account is enrolled in a predetermined security system;
    upon determining that the cardholder account is enrolled in the predetermined security system, identify one or more parameters associated with a cardholder account, the one or more parameters assigning a likelihood of a fraud associated with the first request for authorization
    determine that the geolocation of the origin of the first financial transaction is different from a geolocation associated with the cardholder account;
    based on the determination that the geolocation of the origin of the first financial transaction is different from the geolocation associated with the cardholder account, refer the first request to the user to verify a legitimacy or an illegitimacy of the first request;
    based on the identified one or more parameters, reduce processor load of the financial transaction processing computing device at least by automatically approving the first request;
    upon receiving a reply to the referral after the automatic approval of the first request and the reply comprising information that the first financial transaction was an illegitimate transaction, automatically process a chargeback to the user, and update the one or more parameters, such that the updated one or more parameters assign a high likelihood of fraud to a subsequent financial transaction at least in cases where a geolocation of origin of the subsequent financial transaction is different from the geolocation associated with the cardholder account; and
    based on the one or more updated parameters, reducing the processor load by at least reducing the number of requests to confirm a potentially fraudulent financial transaction by automatically declining a subsequent request for authorization of the subsequent financial transaction associated with the cardholder account without prompting the cardholder to verify the subsequent financial transaction.

17. The computer-readable storage device of claim 16, wherein, upon execution by the at least one processor, the computer-executable instructions further cause the processor to: upon the request for authorization being automatically declined and a confirmation that the first financial transaction was illegitimate being received later, maintain the one or more parameters causing a same decision to be made for a subsequent financial transaction when the subsequent financial transaction has same one or more first factors associated with the subsequent financial transaction.

18. The computer-readable storage device of claim 16, wherein, upon execution by the at least one processor, the computer-executable instructions further cause the processor to:
    generate a first score associated with the first financial transaction;
    on condition that the first score lies between a first threshold and a second threshold, the second threshold being more than the first threshold, flag the first request for authorization as potentially fraudulent without approving the first request for authorization; and
    perform additional analysis of the first request to determine whether to approve the first request or deny the first request.

19. The computer-readable storage device of claim 18, wherein performing additional analysis of the first request to determine whether to approve the first request or deny the first request comprises:

automatically communicating with the cardholder and requesting verification of a legitimacy of the first request; and approving or denying the first request based on input from the cardholder.

20. The computer-readable storage device of claim 16, wherein, upon execution by the at least one processor, the computer-executable instructions further cause the processor to reduce network bandwidth usage at least by using the one or more updated parameters for processing subsequent financial transactions.

\* \* \* \* \*